US012680566B2

(12) United States Patent
Hoffstetter et al.

(10) Patent No.: US 12,680,566 B2
(45) Date of Patent: Jul. 14, 2026

(54) DEVICE, SYSTEM AND METHOD FOR LOCKING A CONNECTION ELEMENT

(71) Applicant: Mavig GmbH, Munich (DE)

(72) Inventors: Marc Hoffstetter, Munich (DE); Georg Muratidi, Oberaula (DE)

(73) Assignee: MAVIG GMBH, Munich (DE)

( * ) Notice: Subject to any disclaimer, the term of this patent is extended or adjusted under 35 U.S.C. 154(b) by 449 days.

(21) Appl. No.: 17/525,107

(22) Filed: Nov. 12, 2021

(65) Prior Publication Data

US 2022/0154753 A1     May 19, 2022

(30) Foreign Application Priority Data

Nov. 13, 2020     (DE) ..................... 10 2020 214 296.3

(51) Int. Cl.
 *F16B 21/16*          (2006.01)
 *F16L 37/086*          (2006.01)

(52) U.S. Cl.
 CPC ............. *F16B 21/16* (2013.01); *F16L 37/086* (2013.01)

(58) Field of Classification Search
 CPC ........ F16B 21/16; F16B 7/105; F16B 7/0426; F16L 37/086; Y10T 403/602; Y10T 403/604; Y10T 403/598
 See application file for complete search history.

(56) References Cited

U.S. PATENT DOCUMENTS

| | | | | | |
|---|---|---|---|---|---|
| 1,645,457 | A | * | 10/1927 | Schall | ................ A63B 21/0728 |
| | | | | | 403/379.5 |
| 1,732,081 | A | * | 10/1929 | Clement | .............. B25H 1/0007 |
| | | | | | 269/84 |
| 2,431,268 | A | * | 11/1947 | Mcintyre | .............. F16L 37/086 |
| | | | | | 285/317 |
| 3,753,361 | A | * | 8/1973 | Schiesterl | ......... B60R 25/02115 |
| | | | | | 403/324 |
| 4,113,221 | A | * | 9/1978 | Wehner | .................. A47C 7/004 |
| | | | | | 403/324 |
| 4,339,148 | A | * | 7/1982 | Smith | .................. B62D 21/186 |
| | | | | | 296/35.3 |
| 4,602,890 | A | | 7/1986 | Duda | |
| 4,725,027 | A | | 2/1988 | Bekanich | |

(Continued)

FOREIGN PATENT DOCUMENTS

| | | | | | |
|---|---|---|---|---|---|
| EP | 1790249 | A1 | * | 5/2007 | ............. A45D 20/32 |
| EP | 1808634 | A1 | * | 7/2007 | ............. F16M 11/06 |

(Continued)

OTHER PUBLICATIONS

Office Action dated Jun. 30, 2021 from related German Patent Application DE 10 2020 214 296.3 together with English language translation.

*Primary Examiner* — Matthew R Mcmahon

(74) *Attorney, Agent, or Firm* — Scully, Scott, Murphy & Presser, P.C.

(57) ABSTRACT

The present invention relates to a device for locking a connection element to a tube as well as a system comprising the same. The device is configured such that the securing segment of its securing element is automatically engaged with a recess of the connection element when the connection element has reached its locking position within the tube. Thus, the connection element is locked in the tube. Furthermore, the present invention relates to a method for locking a connection element in a tube.

10 Claims, 5 Drawing Sheets

(56)          References Cited

U.S. PATENT DOCUMENTS

| | | | | | |
|---|---|---|---|---|---|
| 5,080,519 | A | * | 1/1992 | Chi | F16B 7/14 |
| | | | | | 403/324 |
| 5,366,191 | A | * | 11/1994 | Bekanich | F16M 13/02 |
| | | | | | 403/328 |
| 5,829,480 | A | * | 11/1998 | Smith, III | F16L 37/086 |
| | | | | | 285/317 |
| 6,422,108 | B1 | * | 7/2002 | Hirzmann | B62D 1/10 |
| | | | | | 74/522 |
| 6,908,222 | B2 | * | 6/2005 | Brunswick | B01F 27/805 |
| | | | | | 403/375 |
| 7,431,531 | B2 | * | 10/2008 | Carnevali | B25G 3/26 |
| | | | | | 403/328 |
| 8,752,810 | B2 | * | 6/2014 | Anderson | F16F 9/56 |
| | | | | | 188/300 |
| 9,243,748 | B2 | * | 1/2016 | Kuo | F16N 3/12 |
| 10,221,995 | B1 | * | 3/2019 | Kuo | F16N 3/12 |
| 10,627,032 | B2 | * | 4/2020 | Lu | F16L 37/0841 |

FOREIGN PATENT DOCUMENTS

| | | | | | |
|---|---|---|---|---|---|
| EP | 1808634 | B1 | | 10/2008 | |
| EP | 1790249 | B1 | | 8/2011 | |
| FR | 2585787 | A1 | * | 2/1987 | F16B 21/16 |
| GB | 260092 | A | * | 10/1926 | F16L 37/086 |
| GB | 322336 | A | * | 12/1929 | F16L 37/086 |
| GB | 529172 | A | * | 11/1940 | F16L 37/086 |
| GB | 1282994 | A | * | 7/1972 | F16L 37/086 |

* cited by examiner

1

DEVICE, SYSTEM AND METHOD FOR LOCKING A CONNECTION ELEMENT

FIELD OF THE INVENTION

The present invention relates to a device for locking a connection element to a tube as well as to a system comprising the same. In particular, the present invention relates to a device for locking a connection element to a tube as well as to a system comprising the same, wherein the securing segment of the securing element of the device is automatically engaged with a recess of the connection element to be locked. Furthermore, the present invention relates to a method for locking a connection element in the end portion of a tube.

PRIOR ART

Connection elements, for example medical equipment, are mostly attached to the corresponding holders/tubes and secured against axial displacement by means of a securing element. The securing element is usually inserted into a lateral groove of the tube and engages under a shoulder in the connection element. This leads to an axially stable connection between the connection element and the tube. Then, a securing sleeve is moved from the top over the securing element and screwed thereto, so that the securing element is held in its position and the connection element cannot fall out of the tube.

FIG. 1 shows a schematic view of an attachment of a connection element 5 to a tube 1 according to the prior art. Here, a securing element 4 is engaged with a recess 6 of the connection element 5. The securing element is held in position by means of a securing sleeve 2 which is attached to the tube 1 by means of a screw 3. Thus, radial displacement of the securing element 4 is prevented and the connection element 5 is safely fixed to the tube 1.

EP 1 808 634 B1 describes a locking mechanism for fixing a part to be mounted to a holding part. The locking mechanism comprises a screw with a screw head, which protrudes into the holding part or the part to be mounted. The screw head is arranged in a recess of a sleeve and is freely movable when the part to be mounted rotates relative to the holding part.

EP 1 790 249 B1 describes a manually operable securing device which is essentially formed as a U-shaped wire clip, the resilient limbs of which engage in a corresponding groove of a connecting pin for securing a device to a stand tube.

It is an object of the present invention to provide a device, a system and a method which allow a connection element to be safely and easily mounted to a tube. Furthermore, it is an object of the present invention to avoid incorrect mounting of the connection element in the tube.

BRIEF DESCRIPTION OF THE INVENTION

The mentioned objects are achieved by the locking device as well as the system comprising the same and by the method according to the independent claims. Further aspects of the invention are mentioned in the dependent claims.

According to a first aspect, the present invention relates to a device for locking a connection element to a tube. The device comprises a housing and a securing element having a shaft and a securing segment at a first end of the shaft. The securing element is movably arranged in the housing. A spring is arranged in the housing in such a manner that it exerts a force on the securing element in a longitudinal direction of the securing element.

The tube is preferably a part of a holding arm system which is fixedly or movably (e.g. on rollers) attached to a ceiling, a wall or the floor.

The tube preferably corresponds to an end portion of the holding arm system.

The tube is preferably configured as an elongate hollow body and/or made of a substantially inflexible material.

In the distribution state of the device, the securing element is preferably already preassembled in the housing so that it cannot be incorrectly positioned or forgotten when mounting the connection element to the tube.

Preferably, the device further comprises a widening portion provided between the shaft and the securing segment and widened in at least one spatial direction, preferably in at least two spatial directions relative to the shaft and/or the securing segment.

Preferably, the device further comprises a stop formed within the housing, wherein the spring is arranged between the stop and the widening portion.

The widening portion preferably serves as a force-transmitting element for moving the securing element along its longitudinal axis by means of the spring force.

Furthermore, the widening portion can serve as a stop for blocking the movement of the securing element along its longitudinal axis at a defined position. To this end, the widening portion can abut, for example, against the outer shell surface of the tube.

The housing preferably comprises a first opening out of which the shaft protrudes at least partially.

Furthermore, at is end protruding out of the housing, the shaft can comprise a preferably circumferential recess and/or a marking for indicating a penetration depth of the shaft into the housing.

The housing can comprise a second opening out of which the securing segment or the widening portion protrudes at least partially.

Preferably, the housing is configured to be fixed to a tube and/or an adapter element.

Preferably, the securing segment comprises a chamfer at its free end. This is advantageous for displacing the securing element at least partially out of the inner space of the tube against the spring force of the spring when the connection element is inserted into the tube along its longitudinal direction. In particular, the chamfer of the securing segment slides easily along the outermost edge of the connection element until the front side of the securing segment contacts the shell surface of the connection element.

At its second opening, the housing can have a stop with which the widening portion of the securing element can be brought in contact. Thus, movement of the securing element along its longitudinal axis can be stopped at a defined end position, so that it can be guaranteed that the securing segment does not protrude too far out of the housing into the tube. Alternatively, movement of the securing element can be stopped by the stop of the widening portion at the shell surface of the tube. The end position is preferably selected such that when the connection element is being inserted into the tube, the connection element comes in contact with the chamfer of the securing segment. Thus, the insertion of the connection element is simplified because the securing element can be more easily displaced out of the inner space of the tube against the spring force.

The connection element preferably has a recess which is configured to be engaged with the securing segment when the connection element has been inserted into the tube.

The spring is preferably configured to engage the securing segment with the recess of the connection element in a locking state in which the connection element has been inserted into the tube by a predefined length and to maintain this engagement, and the recess of the connection element is preferably a circumferential recess.

According to a further aspect, the present invention relates to a system for fixing a connection element to a tube. The system comprises the locking device described above. The system further comprises a tube with an opening in the wall of the tube. The locking device is arranged at the tube in such a manner that the securing segment of the locking device can protrude at least partially through the opening into the inner space of the tube.

The system comprises a connection element which is configured to be inserted at least partially into the tube, wherein the connection element further comprises a recess which is configured to be engaged with the securing segment of the locking device when the connection element has been inserted into the tube.

Preferably, in an initial state in which the connection element has not yet been inserted or has been inserted only partially (at most until a contact point of the connection element and the securing segment) into the tube, the securing segment is configured to protrude at least partially (with one end) into the inner space of the tube through the opening of the tube. The other, opposite, end of the securing element preferably protrudes out of the housing.

In the initial state it is preferably not possible to attach covering parts to the device or the system. To this end, the shaft can, for example, protrude far enough out of the housing that no covering parts can be fixed thereto or over it or that corresponding fixing elements of the covering parts cannot be connected to the housing. Alternatively, the device and/or the tube can comprise corresponding elements which prevent mounting of covering parts in the initial state. This reduces the risk of incorrect mounting.

The connection element is preferably configured to displace the securing segment at least partially out of the inner space of the tube against the spring force of the spring in a mounting state in which the connection element is inserted into the tube. The connection element preferably has a diameter allowing the above-mentioned displacement (e.g., inner diameter of the tube> diameter of the connection element>inner diameter of the tube—penetration depth of the securing segment). Here, the front end of the connection element presses the securing segment so far in a direction contrary to the direction of the spring force until movement of the connection element along its longitudinal direction into the tube becomes possible. Because of the further advance of the connection element into the tube, the securing segment slides along an outer shell surface of the connection element.

The recess of the connection element is preferably configured to be engaged with the securing segment in a locking state in which the connection element is in its locking position within the tube. The locking position is the end position of the connection element within the tube in the longitudinal direction.

The spring is preferably configured to bring and hold the securing segment in engagement with the recess of the connection element in the locking state. Thus, movement of the securing segment out of the interior of the tube is prevented and the connection element is safely axially fixed to the tube.

Engagement of the securing segment in the recess of the connection element is preferably realized only because of the spring force, without the operator having to take any additional action.

Engagement of the securing segment in the recess is preferably confirmed by an optical indication and/or a haptic and/or acoustic signal in order to indicate the correct locking position of the connection element in the tube to the operator.

The optical indication can be, for example, a mark and/or engraving or the like on the shaft of the securing element, which indicates the penetration depth of the shaft into the housing.

The haptic and/or acoustic signal is preferably caused by the locking of the securing segment in the recess of the connection element. The haptic and/or acoustic signal can be, for example, a clicking, a vibration or the like.

The device is preferably configured such that it is only possible to mount covering parts that cover the device when the connection element is in the correct locking position. To this end, the device or its housing and/or connection element and/or tube can comprise corresponding elements, for example protrusions, grooves, locking elements or the like, which prevent engagement of covering parts when the connection element is not in its correct locking position. Alternatively, mounting of covering parts can be blocked by the position of the shaft, i.e. its penetration depth into the housing, when the connection element is not in the correct locking position.

The recess of the connection element can be a circumferential recess. This allows a relative fixing of the connection element in the longitudinal direction without thereby blocking rotation of the connection element relative to the tube. Thus, an axially fixed, rotatable connection between the connection element and the tube is formed.

The connection element can further comprise at least one further recess which is preferably configured as a hole and arranged below the recess.

Furthermore, an end of the connection element which is inserted into the tube can be realized as a hollow cylinder which preferably has a chamfer at an outer side and/or an inner side. This facilitates mounting of the connection element in the tube because the securing segment can more easily slide along the front side of the connection element and thus the connection element can be inserted more smoothly into the tube.

The tube can further comprise an adapter element which is configured to fix the housing of the locking device thereto.

The tube can optionally have a stop at its inner wall surface, which blocks movement of the connection element in the longitudinal direction when the recess of the connection element is located at the height of the securing segment. Thus, the connection element can be prevented from being inserted too far into the tube. This configuration is particularly advantageous when the recess is not formed circumferentially on the connection element, because in this case there is the risk that the connection element is inserted too far into the tube without the securing segment engaging in the recess of the connection element.

Furthermore, the tube can be configured such that in a portion along its longitudinal direction it has a larger inner diameter than at the end at which the connection element is inserted into the tube.

Preferably, this portion is configured such that the outer shell surface of the connection element contacts the inner wall of the tube both above and below the engagement of the securing segment in the recess of the connection element.

Thus, rotation of the connection element relative to the tube, about an axis perpendicular to the longitudinal direction of the connection element/tube, can be prevented, so that the connection element cannot tilt within the tube.

According to a further aspect, the present invention relates to a method for locking a connection element to a tube by means of the device according to the invention or the system according to the invention, wherein the securing segment of the securing element of the device protrudes at least partially into the interior of the tube. In a first method step, the connection element is inserted into an end portion of the tube, wherein preferably a front side of the connection element is brought in contact with the securing segment of the securing element of the device protruding into the interior of the tube. Then, the connection element is advanced along a longitudinal direction of the tube, so that the securing segment is displaced out of the interior of the tube in that the securing segment slides along the front side or a shell surface of the connection element and is thus displaced along its longitudinal direction, so that movement of the connection element into the interior of the end portion of the tube becomes possible. In a third method step, the connection element is locked in a locking position within the end portion of the tube, wherein the securing element of the device is moved by the spring force of the spring along its longitudinal direction, so that the securing segment is preferably engaged with the recess of the connection element, so that movement of the connection element along its longitudinal direction is blocked.

The engagement is preferably confirmed by the output of an optical and/or haptic and/or acoustic signal.

A further aspect of the present invention is the use of the device according to the invention or the system according to the invention in a support arm system for medical devices.

It is an advantage of the device according to the invention, the system according to the invention as well as the method according to the invention that a connection element can be easily connected to a tube. This can be done, for example, by one hand because no manual positioning and locking of the securing segment in the recess of the connection element is necessary, which simplifies mounting and handling. According to the present invention, the securing element also can be mounted within the housing already before mounting of the connection element, so that the securing element can be prevented from falling out when the connection element is mounted to the tube. Thus, it is prevented that the securing element is forgotten or positioned incorrectly during mounting, which reduces the risk of an incorrect mounting of the connection element to the tube. Moreover, it can be prevented that covering parts can be fixed to the device before the connection element is in its correct locking position, which, as well, increases the safety when the connection element is mounted to the tube.

BRIEF DESCRIPTION OF THE FIGURES

The invention is explained in more detail based on the attached Figures in which.

DETAILED DESCRIPTION OF THE INVENTION

Figure 1:
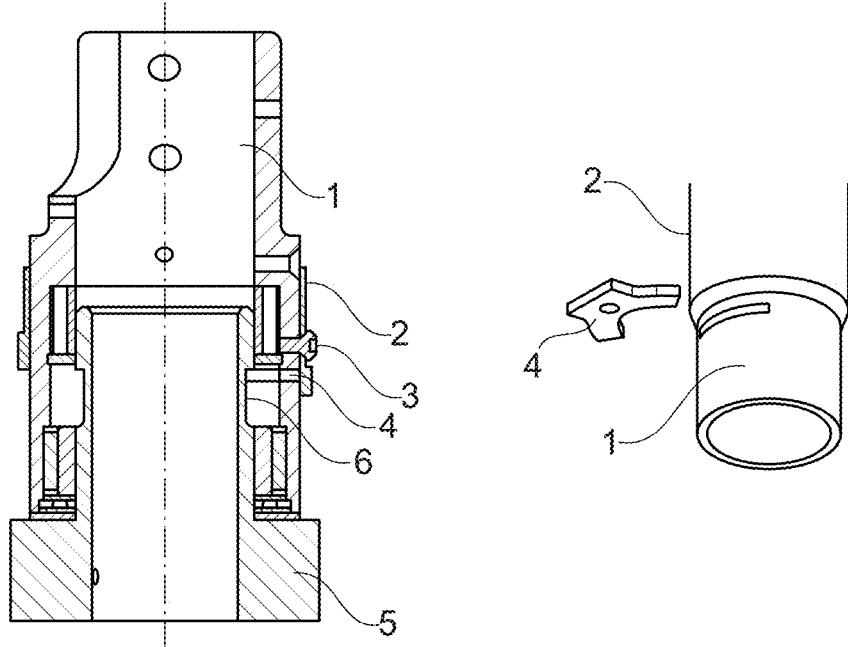
FIG. 1 shows a schematic view of a fixing of a connection element to a tube according to the prior art.
Figure 2:
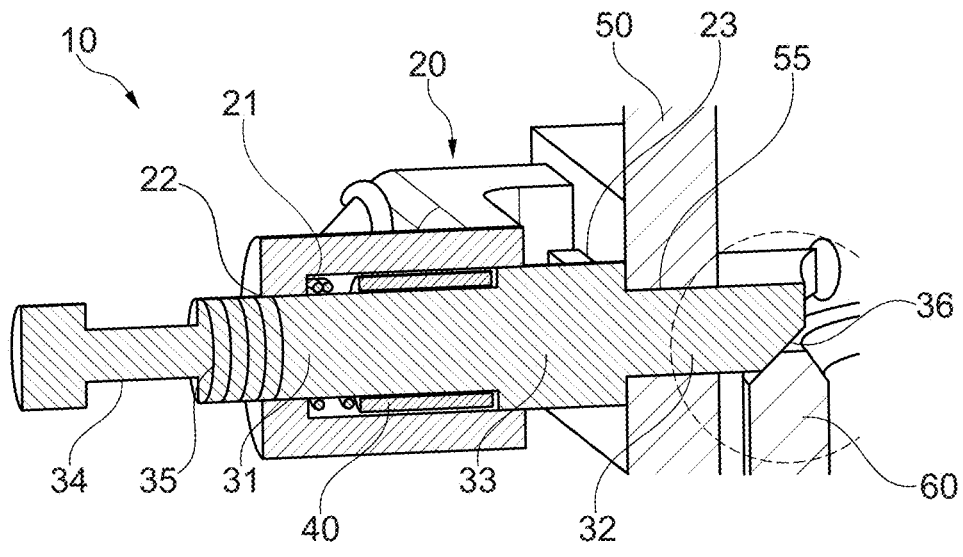
FIG. 2 shows a schematic view of an embodiment of the device according to the invention for locking a connection element to a tube.
Figure 3:
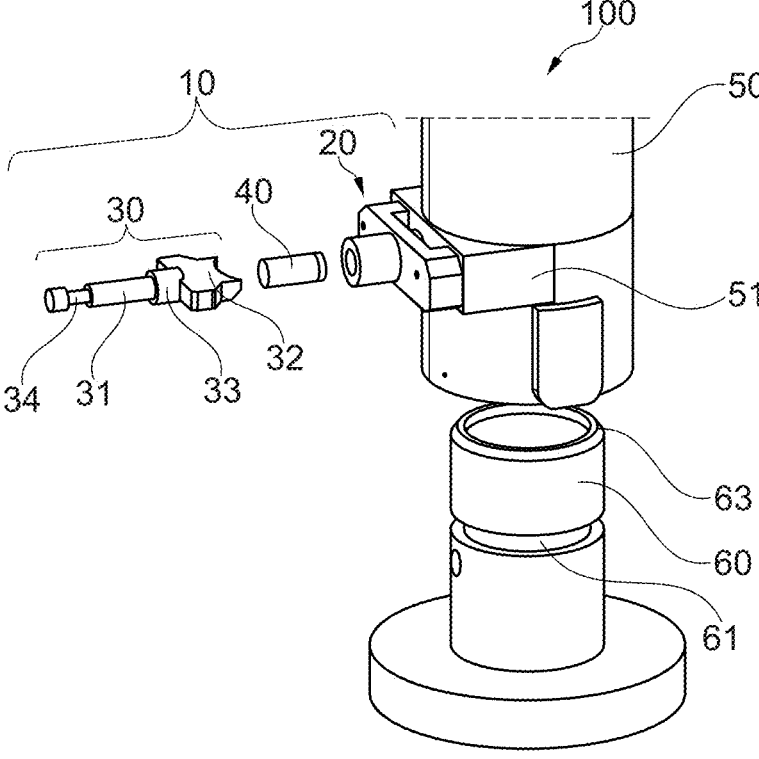
FIG. 3 shows a schematic, exploded perspective view of the embodiment of the device according to the invention and the system according to the invention for locking a connection element to a tube.

FIGS. 2 and 3 show an embodiment of the device 10 according to the invention for locking a connection element 60 to a tube 50. The device 10 comprises a housing 20 and a securing element 30. The securing element 30 has a shaft 31 at the first end of which a securing segment 32 is located. The securing element 30 is movably arranged in the housing 20. A spring 40 is arranged in the housing 20 in such a manner that it exerts a force on the securing element 30 in a longitudinal direction of the securing element 30, so that the securing element 30 is moved along its longitudinal direction.

In the delivery state of the device 10, the securing element 30 is already preassembled in the housing 20 (see FIG. 2), so that it cannot be incorrectly positioned or forgotten when the connection element 60 is mounted to the tube 50.

The securing element 30 further comprises a widening portion 33 which is provided between the shaft 31 and the securing segment 32 and widened in at least one spatial direction, preferably in at least two spatial directions (in a Cartesian coordinate system) relative to the shaft 31 and/or the securing segment 32.

Figure 3A:
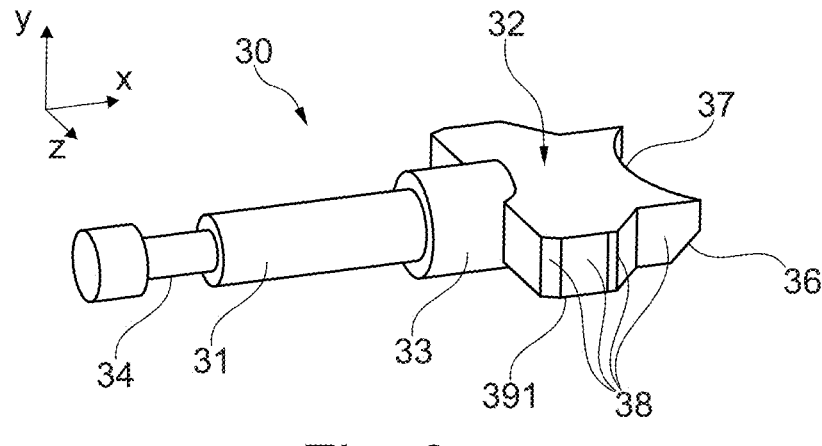
FIG. 3a shows an enlarged view of a part of FIG. 3.

As shown in FIG. 3a, the securing segment 32 is flat in a x-z-plane and has a concave front surface 37 as well as partially convex side surfaces 38. The front surface 37 is located at the free end of the securing segment 32, which is opposite to the surface at which the securing segment 32 is connected to the widening portion 33 of the securing element 30. The edge at which the front surface 37 is in contact with a lower side 391 (not visible) of the securing segment 32 is chamfered by a chamfer 36. The securing segment 32 is longer along the z-direction than along the x-direction (=longitudinal axis of the securing element 30). Along the y-direction, the securing segment 32 is shorter than along the x-direction. Seen in the y-direction (top view), the side surfaces 38 of the securing segment 32 in the x-direction first extend away from each other, then extend parallel and towards each other, respectively, so that their partially convex shape is formed. Close to the front surface 37, the side surfaces extend parallel to each other. In the top view, the securing segment 32 thus has an essentially "trapezoidal" shape. The radius of the concave front surface 37 is adapted to the outer circumference of a recess 61 of the connection element 60 (see FIG. 3).

Furthermore, the device 10 comprises a stop 21 formed within the housing 20, wherein the spring 40 is arranged between the stop 21 and the widening portion 33.

The housing 20 comprises a first opening 22 out of which the shaft 31 protrudes at least partially. Furthermore, at its end protruding out of the housing 20, the shaft 31 comprises a circumferential recess 34 and/or a marking 35 for indicating a penetration depth of the shaft 31 into the housing 20.

The housing 20 comprises a second opening 23 out of which the securing segment 32 or the widening portion 33 protrudes at least partially. The housing 20 is configured to be fixed to a tube 50 and/or an adapter element 51, for example by screwing. Furthermore, the securing segment 32 has a chamfer 36 at its free end.

As shown in FIG. 3, the tube 50 further comprises an adapter element 51 which is configured to fix the housing 20 of the device 10 thereto.

Figure 4:
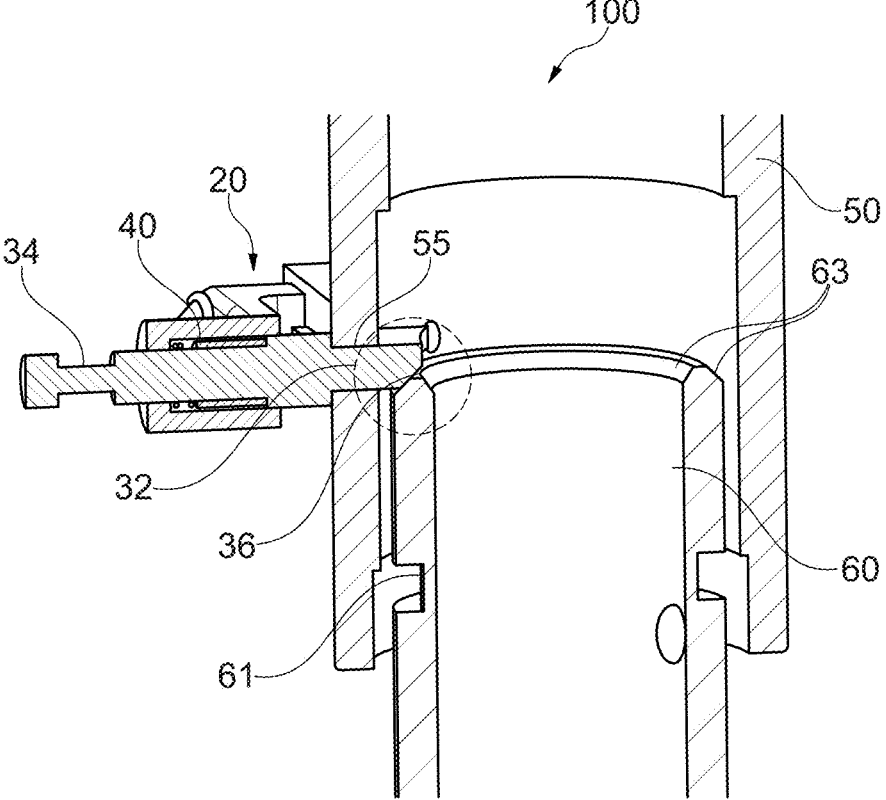
FIG. 4 shows a schematic view of the embodiment of the device according to the invention and the system according to the invention for locking a connection element to a tube.

FIG. 4 shows the system 100 according to the invention for fixing a connection element 60 to a tube 50. The system 100 comprises the locking device 10 described above. Furthermore, the system comprises a tube 50 having an opening 55 in its wall. The locking device 10 is arranged at the tube 50 in such a manner that the securing segment 32 of the locking device 10 protrudes at least partially through the opening into the inner space of the tube 50. The system 100 comprises a connection element 60 which is configured to be inserted at least partially into the tube 50, wherein the connection element 60 further comprises a recess 61 which is configured to be engaged with the securing segment 32 of the device 10 when the connection element 60 has been inserted into the tube 50.

Figure 5:
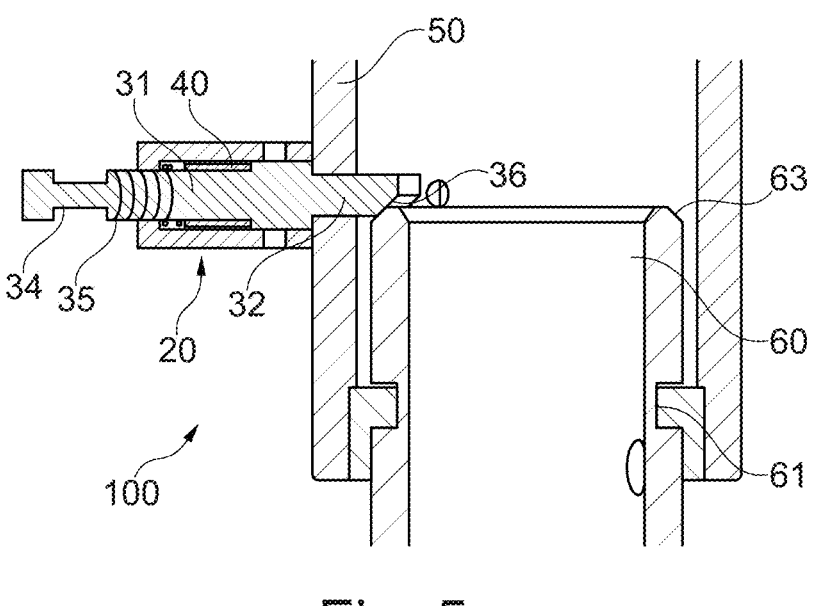
FIG. 5 shows a schematic view of the embodiment of the device according to the invention and the system according to the invention in the initial state.

FIG. 5 shows the system 100 according to the invention in the initial state. In this state, the connection element 60 has not yet been inserted into the tube 50 up to its final position, the locking position, i.e. the front side of the connection element 60 has been inserted into the tube at most until the contact point with the securing segment 32. The securing segment 32 protrudes into the inner space of the tube 50. The other end of the securing element, more precisely its shaft 31, protrudes out of the housing 20. Furthermore, at this end the shaft 31 comprises a circumferential recess 34 and/or a marking 35 for indicating a penetration depth of the shaft 31 into the housing 20.

Figure 6:
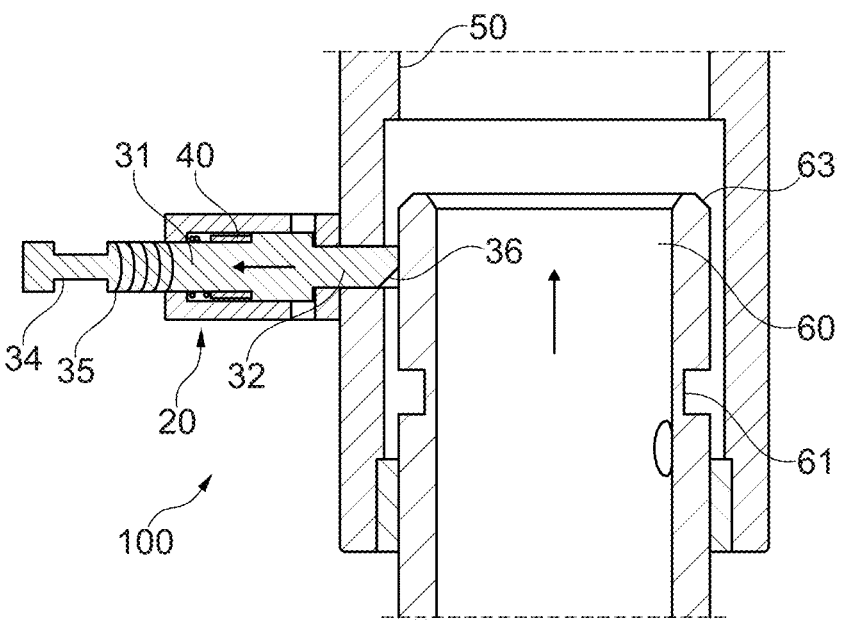
FIG. 6 shows a schematic view of the embodiment of the device according to the invention and the system according to the invention in the mounted state.

FIG. 6 shows the mounting state in which the connection element 60 is inserted into the tube 50 along its longitudinal direction (see direction of the arrow). The insertion movement causes the securing segment 32 to be displaced out of the interior of the tube 50, so that the securing element 30 moves out of the housing 20 along its longitudinal direction. The chamfer 36 provided at the securing segment 32 slides along the front side of the connection element 60. Likewise, the connection element 60 has a chamfer 63 facilitating the sliding of the chamfer 36.

Figure 7:
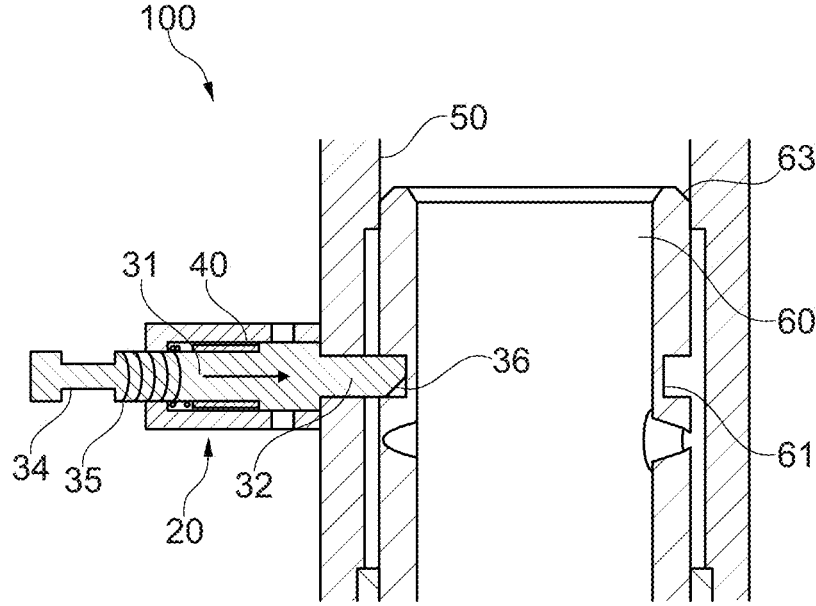
FIG. 7 shows a schematic view of the embodiment of the device according to the invention and the system according to the invention in the locked state.

FIG. 7 shows the connection element 60 in the locking state, i.e. when the connection element 60 has reached its final position within the tube 50. In this state, the securing element 30 is pressed by the spring force of the spring 40 along its longitudinal direction (see direction of the arrow) into the interior of the tube 50. Thus, the securing segment 32 is engaged with the recess 61 of the connection element 60 and the connection element 60 is locked at the tube 50.

The longitudinal direction of the connection element 60 and the longitudinal direction of the tube 50 extend essentially perpendicular with respect to the longitudinal direction of the securing element 30.

Although the invention has been illustrated and described in detail based on the Figures and the corresponding description, this illustration and this detailed description should be understood as being illustrative and exemplary and not as limiting the invention. It will be understood that changes and modifications may be made by those of ordinary skill without departing from the scope of the following claims. In particular, the invention also comprises embodiments with any combination of features mentioned or shown above with respect to various aspects and/or embodiments.

The invention also comprises individual features in the Figures, even if they are shown therein in connection with other features and/or have not been mentioned above.

Furthermore, the term "comprising" and derivations thereof do not exclude other elements or steps. Moreover, the indefinite article "a"/"an" and derivations thereof do not exclude a plurality. The functions of a plurality of features mentioned in the claims can be fulfilled by one entity. The terms "essentially", "about", "approximately" and the like in connection with a characteristic or a value especially define also the exact characteristic or the exact value. All reference signs in the claims should not be understood as limiting the scope of the claims.

The invention claimed is:

1. A system configured to be fixedly or movably attached to a ceiling, a wall or the floor, the system comprising:
   a tube comprising an opening in a wall of the tube,
   a connection element which is configured to be inserted at least partially into the tube;
   a locking device comprising a securing element with a shaft and a securing segment at a first end of the shaft, and a housing, the securing segment comprising a concave front surface, wherein the securing element is movably arranged in the housing, wherein the locking device is arranged at the tube such that the securing segment of the locking device can protrude at least partially through the opening into the interior of the tube;
   a spring which is arranged in the housing such that the spring exerts a spring force on the securing element in a longitudinal direction of the securing element;
   wherein the connection element comprises a recess which is configured to be engaged with the securing segment of the locking device when the connection element has been inserted into the tube, wherein the recess is a circumferential recess, wherein the system is configured to allow a relative fixing of the connection element in a longitudinal direction while allowing rotation of the fixed connection element relative to the tube to provide an axially fixed, rotatable connection between the fixed connection element and the tube,
   wherein the connection element has a cylindrical outer shell surface, having a first portion and a second portion arranged on opposite sides of the circumferential recess, wherein the first portion, and the second portion each extend along the longitudinal direction of the connection element by a greater distance than the circumferential recess, and wherein the first portion and the second portion contact an inner wall of the tube,
   wherein an end of the connection element is received completely within the tube, when the locking device is engaged with the recess,
   wherein the recess comprises shoulders at a top and a bottom of the recess so that the securing segment is engaged with the recess of the connection element, such that movement of the connection element along its longitudinal direction is blocked, and wherein the securing segment has a distal end with an axial surface extending along the longitudinal direction of the connection element and a chamfered section, wherein the locking device is configured such that the chamfered section slides along a front side of the connection element.

2. The system according to claim 1, further comprising a widening portion which is provided between the shaft and the securing segment and widened in at least one spatial direction, relative to at least one of the shaft or the securing segment.

3. The system according to claim 2, further comprising a stop formed within the housing, wherein the spring is arranged between the stop and the widening portion.

4. The system according to claim 2 wherein the widening portion provided between the shaft and the securing segment is widened in at least two spatial directions relative to at least one of the shaft or the securing segment.

5. The system according to claim 1, wherein the housing comprises a first opening out of which the shaft protrudes at least partially, wherein, at its end protruding out of the housing, the shaft has at least one of a circumferential recess or a marking for indicating a penetration depth of the shaft into the housing.

6. The system according to claim 1, wherein the housing comprises a second opening out of which at least one of the securing segment or the widening portion protrude(s) at least partially, and wherein the housing is configured to be fixed to at least one of the tube or an adapter element, and wherein the securing segment comprises a chamfer at its free end.

7. The system according to claim 1, wherein the spring is configured to engage the securing segment with the recess of the connection element in a locking state in which the connection element has been inserted into the tube by a predetermined length and to maintain said engagement.

8. The system according to claim 1, wherein an end of the connection element which is inserted into the tube is configured as a hollow cylinder which has a chamfer at at least one of an outer side or an inner side, and wherein the tube further comprises an adapter element which is configured to fix the housing of the locking device thereto.

9. The system of claim 1, wherein the connection element comprises a single recess.

10. A method for locking a connection element to a tube by means of the system according to claim 1, wherein the securing segment of the securing element of the locking device protrudes at least partially into the interior of the tube, wherein the method comprises the following steps:

inserting the connection element into an end portion of the tube, advancing the connection element along a longitudinal direction of the tube such that an end of the connection element is received completely within the tube, wherein the securing segment is displaced out of the interior of the tube in that the securing segment slides along at least one of a front side or a shell surface of the connection element, so that the securing segment is moved along its longitudinal direction and allows a movement of the connection element into the interior of the end portion of the tube, locking the connection element in a locking position within the end portion of the tube, wherein the securing element of the locking device is moved by the spring force of the spring along its longitudinal direction, so that a movement of the connection element along its longitudinal direction is blocked;

wherein the connection element comprises a recess which is configured to be engaged with the securing segment of the locking device when the connection element has been inserted into the tube, wherein the recess is a circumferential recess, wherein the system is configured to allow a relative fixing of the connection element in a longitudinal direction while allowing rotation of the fixed connection element relative to the tube to provide an axially fixed, rotatable connection between the fixed connection element and the tube, wherein the connection element has a cylindrical outer shell surface, having a first portion and a second portion arranged on opposite sides of the circumferential recess, wherein the first portion, and the second portion each extend along the longitudinal direction of the connection element by a greater distance than the circumferential recess, and wherein the first portion and the second portion contact an inner wall of the tube.

*   *   *   *   *